UNITED STATES PATENT OFFICE.

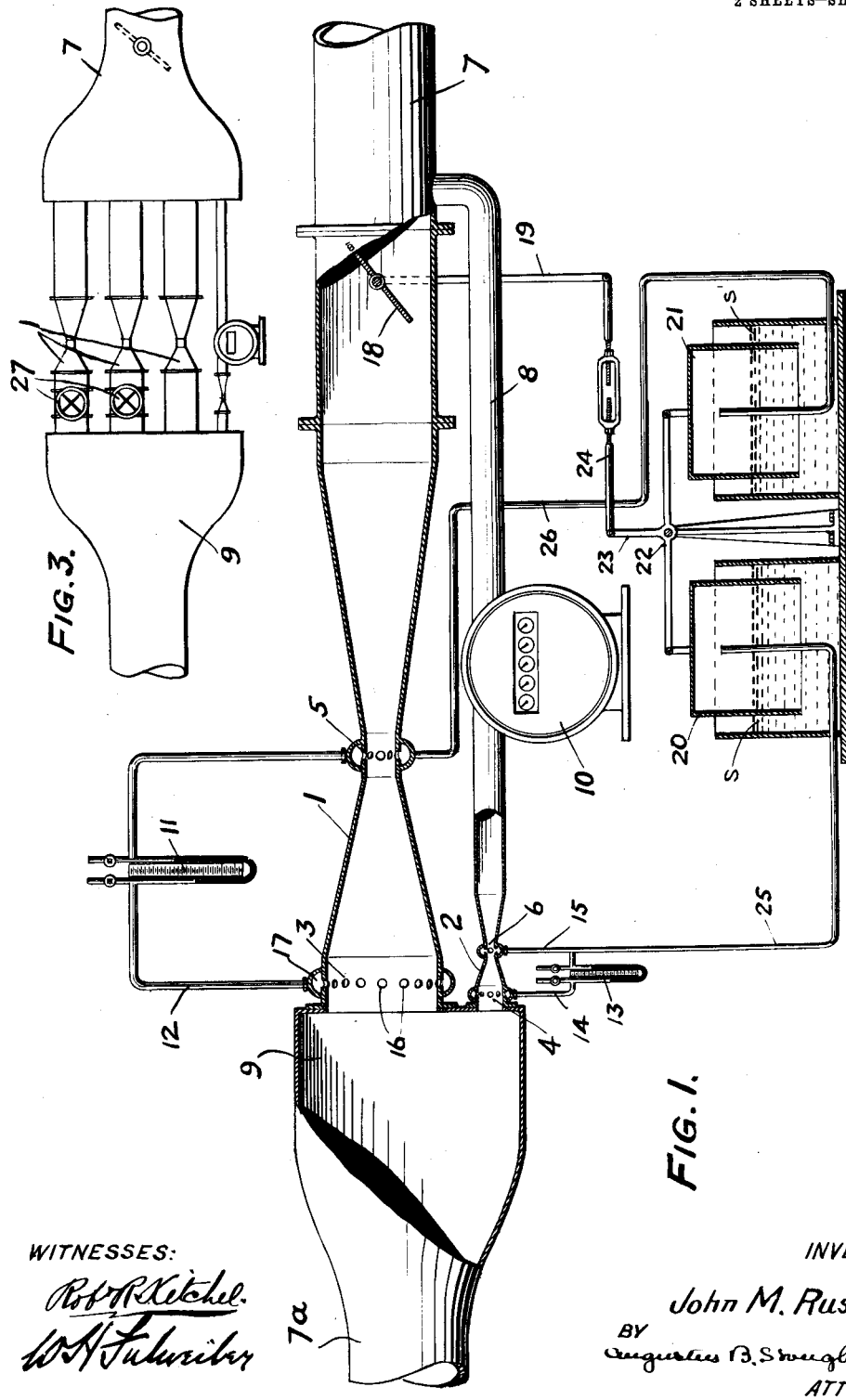

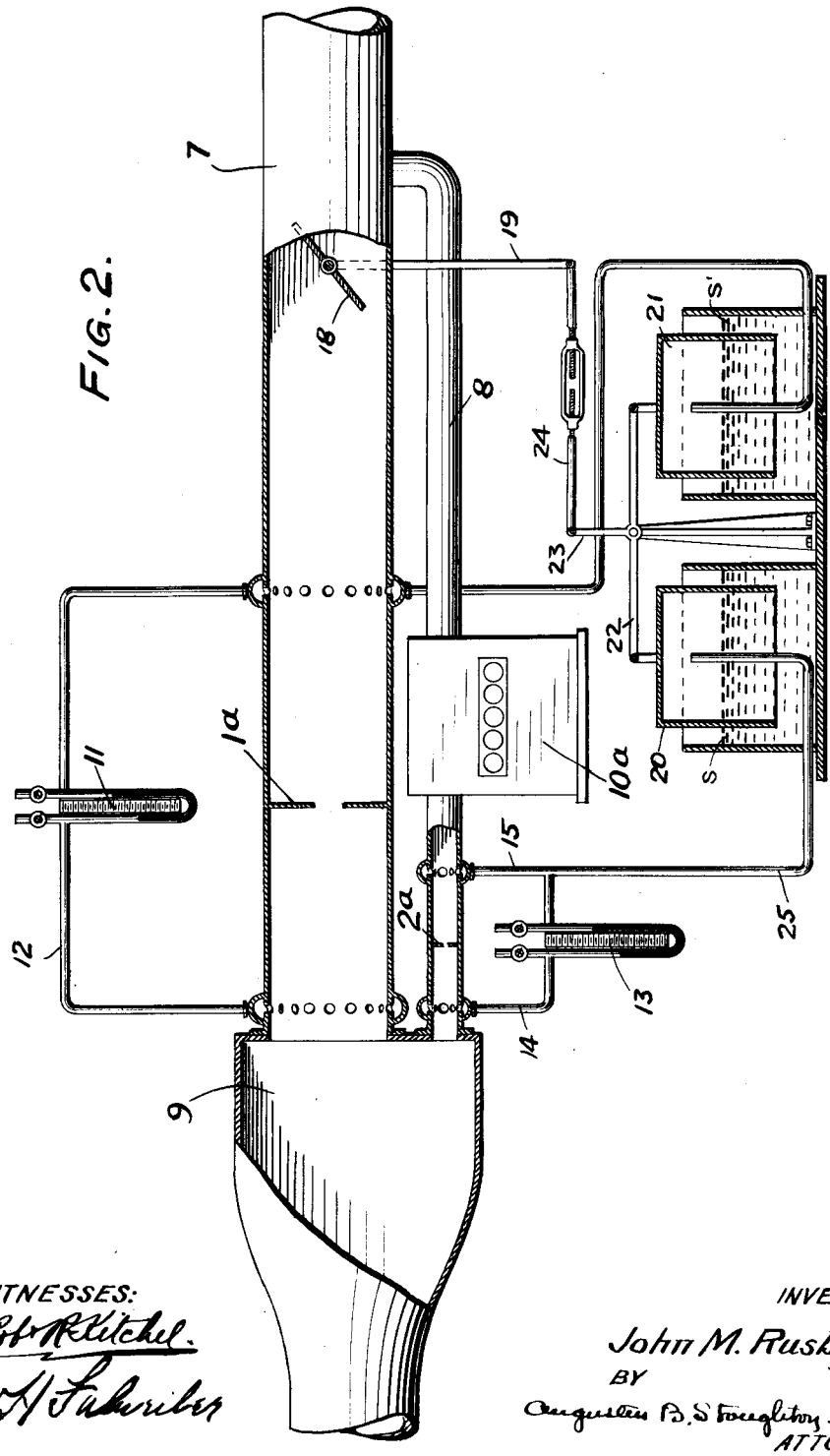

JOHN M. RUSBY, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

REGISTERING-METER FOR GAS AND THE LIKE.

1,105,581.  Specification of Letters Patent.  Patented July 28, 1914.

Application filed January 6, 1911. Serial No. 601,093.

*To all whom it may concern:*

Be it known that I, JOHN M. RUSBY, a citizen of the United States, residing at the city of Philadelphia, in the county of Philadelphia and State of Pennsylvania, have invented a new and useful Registering-Meter for Gas and the like, of which the following is a specification.

The principal object of the present invention is to provide an accurate, compact and comparatively inexpensive meter for measuring and registering the passage of large quantities of gas, air or the like and adapted for use as a station meter as well as for other purposes.

The invention will be claimed at the end hereof but will first be described in connection with the embodiments selected among other embodiments for purposes of illustration in the accompanying drawings in which—

Figure 1, is a view more or less diagrammatic principally in central section illustrating apparatus embodying features of the invention. Fig. 2, is a similar view illustrating apparatus embodying a modification of the invention, and Fig. 3, is a diagrammatic view hereinafter referred to.

Referring to Fig. 1, 1, is a Venturi meter which I believe to be the most suitable and accurate form of meter known, and while it is especially advantageous, still I do not desire to exclude from my invention the use of some other type of meter. 2, is another and smaller Venturi meter but as is the case with the meter 1, it might be replaced by another type of meter although I believe the Venturi type to be the most accurate and for most uses the best. The Venturi meters 1 and 2, are designed to pass proportionate volumes when the differential pressures between their mouths 3 and 4, and throats 5 and 6, are the same. The meter 1, is interposed in the pipe or conduit 7, and the meter 2, is interposed in the by-pass or branch tube or conduit 8. The mouths 3 and 4, of the Venturi tubes communicate with a header 9, applied to the gas conduit or passage 7ª. 10, is a registering meter interposed in the branch or by-pass 8, and it serves to measure the quantity of flow through that branch or by-pass. This registering meter 10, is shown as of the wet drum variety but other types may be used. The registering meter since it is to measure but a small proportionate part of the total flow may be comparatively small and therefore inexpensive and easy to maintain. From the mouth, 3, to the throat 5, extends a pipe connection 12, in which there is interposed a gage 11, by means of which the differential pressure between the mouth and throat of the Venturi meter 1, can be read. Similarly the gage 13, connected by pipes 14 and 15, with the mouth and throat of the Venturi meter 2, serves to measure the differential pressure of that meter. At the mouth of the meter 1, are arranged radial openings 16, that extend through the wall and communicate with an annular chamber 17, to which the required pipe connections are made. The construction at the throats of both meters and at the mouth of the meter 2, is the same and therefore need not be specifically described. The purpose is to obtain accuracy and avoid the possible effect of local currents. The proportionate rate of flow for which the meters 1 and 2, are designed remains constant so long as the differential pressure of each of the meters 1 and 2, is the same. However, the registering meter 10, operates as a resistance in respect to the meter 2, and this resistance varies, for example, with the speed of the meter 10. To insure the maintenance under conditions of operation of the proportionate flow through the meters 1 and 2, a resistance for the meter 1, is supplied and this resistance varies as the resistance of the registering meter 10, varies. The damper 18, is an example of such resistance and by more or less opening or closing the damper its resistance is made variable. The damper 18, is interposed in the pipe 7, and the arm 19, is connected with its spindle, so that by turning the arm 19, the damper 18 is turned, and it may be remarked that a damper is not the only kind of variable resistance that can be employed.

An example of a differential appliance will be described. 20 and 21, are inverted bells attached to the ends of the centrally pivoted beam 22, and they are arranged to dip into appropriate seals $s$ and $s^1$. The beam 22, is provided with an arm 23, that is connected by an adjustable link 24, with the arm 19. From the throat of the Venturi tube 2, extends a pipe 25, that discharges into the bell 20, and from the throat of the Venturi tube 1, extends a pipe 26, that discharges into the bell 21. The position of the damper 18, a resistance member in the pipe 7, varies with the difference in pressure at the throats 5 and 6, so that the resistance 18, compensates for and balances the resistance of the meter 10, and thus the pressures at the throats 5 and 6, are kept equal or if they become unequal they are immediately made equal, and since the mouths 3 and 4, communicate with the header 9, the pressures on the mouths are equal, consequently the difference in pressure between the mouth and the throat or the differential pressure of each Venturi is equal or if the equality is disturbed as by a change of quantity of flow it is immediately restored; this being so the proportionate flow through the two Venturi meters is maintained. If the proportion is nine for the Venturi 1, and one for the Venturi 2, then the reading of the meter 10, multiplied by ten is the flow through the pipes 7 and 7$^a$, that is, the total flow.

To adjust the apparatus reference is made to the gages 11 and 13, and the adjustable link 24, is adjusted until the reading of the two gages is the same, that is, until the differential of the meters 1 and 2, is the same. In use if the pressure at the throat 6, should increase, the bell 20, will rise and shift the arm 19, toward the right, thus closing the damper 18, more or less, so that the pressure at the throat 5, will rise, and in this way the pressures at the two throats are kept equal or if the pressures at the two throats become unequal such inequality is more a tendency than a fact and by it the equality is substantially maintained, and since the pressure at the two mouths is the same, the differential for both meters 1 and 2, is the same and consequently the proportionate flow is maintained. Similarly the bell 20, may fall when the pressure at throat 6, is less than at throat 5, thus moving the arm 19, toward the left and opening the damper 18, more or less. The movement of the arm 19, is responsive to difference in pressure at the throats of the meters 1 and 2, and operates to keep the pressures at both throats equal or if they become unequal to restore equality.

The construction and mode of operation of the apparatus shown in Fig. 2, are the same as described in connection with Fig. 1, except that disks 1$^a$ and 2$^a$, each provided with a central opening are interposed in the pipes 7 and 8, instead of Venturi meters and a dry registering meter 10$^a$, is shown instead of the wet drum meter 10. While the disks 1$^a$ and 2$^a$, constitute in connection with gages, means for measuring the flow of gas or the like said gas, etc., in passing them loses pressure, whereas with the Venturi meters the pressure is restored. The flow through a Venturi meter depends upon the square root of the differential pressure on its mouth and throat, so that to obtain extreme accuracy the differential pressure should be as large as is convenient. To this end and in some cases I may employ several Venturi tubes 1, in parallel instead of one between the header 9, and pipe 7, as shown in Fig. 3, and all but one of these Venturi tubes may be provided with valves 27, so that when the flow is not large the valves 27, may be closed thus cutting out certain Venturi tubes and increasing the flow through and differential pressure of the one that is not cut out. Of course in this case in computing total flow regard must be had to the number of Venturi tubes in service. If the resistance of the meter 10 or 10$^a$ varies, for example, by a change in its speed, as has been mentioned, it follows that this change in resistance of the meter will destroy the equality of the pressures at the throats 5 and 6 or 1$^a$ and 2$^a$. The difference in pressure operates on the bells 20 and 21, thus shifting the device 18. The parts, of course, remain in this new position until the resistance of the meter 10 and 10$^a$ again changes, when there is established a new adjustment. The speed and resistance of the meter 10 or 10$^a$ change because the volume of gas or other substance flowing through the device as a whole, varies or changes; that is, if the flow increases the speed of the meter increases and its resistance increases and if the flow decreases the speed decreases and the resistance decreases.

What I claim is:

1. A meter comprising the combination of valveless proportional measuring devices arranged in parallel, a registering meter operatively arranged in respect to one of said devices, and a variable resistance arranged for coöperation with the other of said devices and responsive to variation in the differential pressures existing in said devices due to changes in flow and adapted to restore said devices to the same working condition by balancing its resistance with the registering meter, substantially as described.

2. A registering meter comprising the combination of valveless proportional measuring devices arranged in parallel, a registering meter arranged in series with one of said devices and causing a variable resistance, and a variable resistance arranged in series with the other of said devices and responsive to differences in pressure due to changes of flow in said devices and adapted to equalize the pressures in said devices by balancing its resistance with the resistance of the registering meter.

3. In a registering meter the combination of valveless proportional measuring devices, and means operated by a departure from equality in the drop in pressure of said devices and adapted to automatically equalize the drop of pressure in each device, thereby keeping the same substantially equal.

4. In a registering meter the combination of valveless proportional measuring devices, a register for one of said devices, and means responsive to inequalities between the drop of pressure at each device and adapted to restore and keep the same drop of pressure at each of said devices.

5. A meter comprising the combination of valveless proportional measuring devices respectively provided with gages for measuring their drops of pressure, a registering meter connected with one of said devices, a resistance connected with the other of said devices, and adjustable differential means responsive to difference in drop of pressure on the devices and adapted to operate said resistance, substantially as described.

6. In a registering meter the combination of valveless proportional measuring devices, a header to which said devices are connected whereby the inlet pressure is the same on each device, a register connected with one of said devices, a resistance connected with the other of said devices, and means adapted to vary said resistance and responsive to differences in pressure on the outlet side of said devices and adapted to equalize the pressure on the outlet side of each device.

7. In a meter the combination of valveless proportional measuring devices, a register for one of said devices, an automatic resistance for the other of said devices, and means responsive to pressure changes between said devices and adapted to make the pressure on both devices the same, substantially as described.

8. In a meter the combination of valveless proportional measuring devices, a registering meter connected with one of said devices, a resistance for the other of said devices, and differential actuating means for automatically changing said resistance to balance it with the resistance of the registering meter, substantially as described.

9. In a meter the combination of valveless proportional measuring devices, a registering meter connected with one of said devices, a resistance for the other of said devices, power appliances connected respectively with the outlet pressure portions of said devices, and connections between the power appliances and the resistance for varying the latter, substantially as described.

10. A meter comprising the combination of proportional Venturi meters, a registering meter through which one of the Venturi meters discharges, a variable resistance for the discharge of the other Venturi meter, and differential pressure actuating means responsive to difference in pressure at the throats of the Venturi meters and adapted automatically to vary said resistance to balance it with the resistance of the registering meter when the throat pressures differ and to restore and maintain the same pressure at the throats of both Venturi meters.

11. A meter comprising the combination of two proportional Venturi meters, a header discharging into the mouths of both Venturi meters whereby the inlet pressure is the same on each, a registering meter through which the smaller Venturi meter discharges, and an automatic resistance and its operating pressure connection for the large Venturi meter whereby throat pressure of the two Venturi meters is maintained the same, substantially as described.

12. In a meter the combination of a header, proportional Venturi meters through which the header discharges, a registering meter through which one of the Venturi meters discharges, a resistance for the other Venturi meter, a differential pressure appliance for varying said resistance, and connections from the throats of the Venturi meters to the differential pressure appliance, substantially as described.

In testimony whereof I have hereunto signed my name.

JOHN M. RUSBY.

Witnesses:
K. M. GILLIGAN,
S. E. PATTERSON.